US009022669B2

(12) United States Patent
de Jong et al.

(10) Patent No.: US 9,022,669 B2
(45) Date of Patent: May 5, 2015

(54) GRADIENT INDEX LENS ASSEMBLIES, FIBER OPTIC CONNECTORS, AND FIBER OPTIC CABLE ASSEMBLIES EMPLOYING LENS ALIGNMENT CHANNELS

(71) Applicants: Michael de Jong, Colleyville, TX (US); Micah Colen Isenhour, Lincolnton, NC (US); Dennis Michael Knecht, Hickory, NC (US); James Phillip Luther, Hickory, NC (US)

(72) Inventors: Michael de Jong, Colleyville, TX (US); Micah Colen Isenhour, Lincolnton, NC (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 96 days.

(21) Appl. No.: 13/723,643

(22) Filed: Dec. 21, 2012

(65) Prior Publication Data

US 2014/0178010 A1    Jun. 26, 2014

(51) Int. Cl.
*G02B 6/36* (2006.01)
*G02B 3/00* (2006.01)
*G02B 6/38* (2006.01)
*G02B 6/42* (2006.01)
*G02B 7/02* (2006.01)

(52) U.S. Cl.
CPC ............ *G02B 3/0087* (2013.01); *G02B 6/3853* (2013.01); *G02B 6/3652* (2013.01); *G02B 6/3885* (2013.01); *G02B 6/4214* (2013.01); *G02B 7/021* (2013.01)

(58) Field of Classification Search
USPC .......................................................... 385/79
See application file for complete search history.

(56) References Cited

U.S. PATENT DOCUMENTS

| 5,150,230 | A | * | 9/1992 | Masuko et al. | 359/34 |
|---|---|---|---|---|---|
| 5,892,868 | A | | 4/1999 | Peck, Jr. et al. | 385/34 |
| 6,011,888 | A | | 1/2000 | Bell | 385/116 |
| 6,253,007 | B1 | | 6/2001 | Laughlin | 385/34 |
| 6,587,618 | B2 | | 7/2003 | Raguin et al. | 385/33 |
| 7,054,070 | B2 | | 5/2006 | Matsumoto et al. | 359/652 |
| 7,802,927 | B2 | | 9/2010 | Benjamin et al. | 385/88 |

FOREIGN PATENT DOCUMENTS

| EP | 0477794 A1 | 4/1992 | ............... G02B 7/02 |
|---|---|---|---|
| GB | 2097550 A | 11/1982 | ............... G02B 7/26 |
| WO | WO2012/099769 A2 | 7/2012 | ............... G02B 6/42 |

OTHER PUBLICATIONS

Patent Cooperation Treaty, International Search Report for PCT/US2013/074881, Mar. 27, 2014, 4 pages.

* cited by examiner

Primary Examiner — Mike Stahl
Assistant Examiner — Kajli Prince

(57) ABSTRACT

Gradient index (GRIN) lens assemblies employing lens alignment channels, as well as fiber optic connectors and fiber optic cable assemblies employing such GRIN lens assemblies, are disclosed. In one embodiment, a GRIN lens assembly includes a lens holder body having a mating face, a surface extending from the mating face, and a lens alignment channel. The lens alignment channel is defined by a narrow portion extending from the surface to a first depth and at least partially along a length of the surface, and a wide portion extending from the narrow portion to a second depth. A lens opening defined by the wide portion of the lens alignment channel at the mating face is disposed in the mating face. The wide portion of the lens alignment channel is configured to support a GRIN lens disposed in the lens alignment channel.

5 Claims, 9 Drawing Sheets

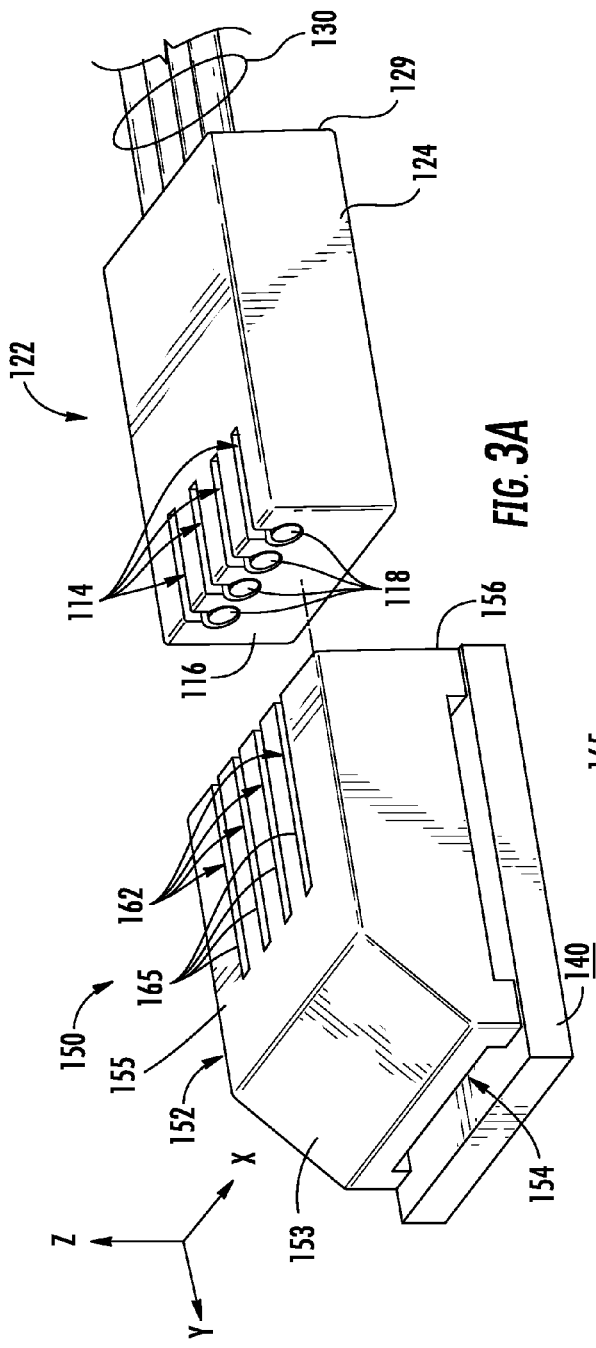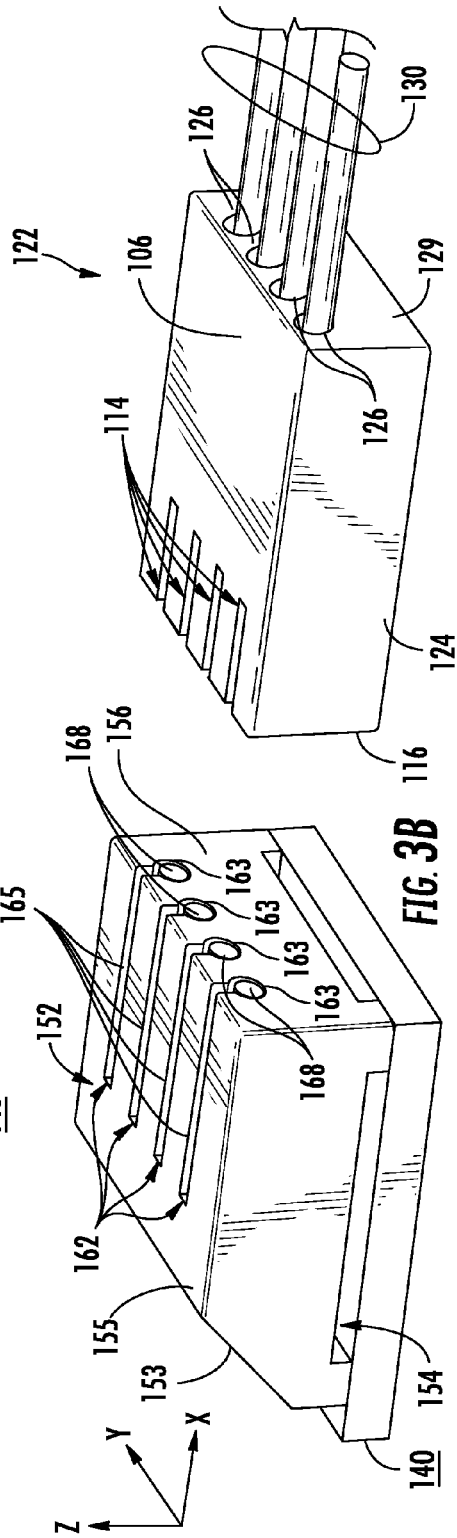
FIG. 3A
FIG. 3B

GRADIENT INDEX LENS ASSEMBLIES, FIBER OPTIC CONNECTORS, AND FIBER OPTIC CABLE ASSEMBLIES EMPLOYING LENS ALIGNMENT CHANNELS

BACKGROUND

1. Field of the Disclosure

The technology of the present disclosure relates to gradient index (GRIN) lens assemblies configured to support GRIN lenses, wherein the GRIN lens assemblies may be employed in plugs and receptacles for facilitating optical connections.

2. Technical Background

Benefits of optical fiber include extremely wide bandwidth and low noise operation. Because of these advantages, optical fiber is increasingly being used for a variety of applications, including, but not limited to, broadband voice, video, and data transmission. Additionally, optical cable assemblies may be utilized in consumer electronics applications to transfer data between electronic devices. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections.

SUMMARY OF THE DETAILED DESCRIPTION

Fiber optic connectors are provided to facilitate optical connections with optical fibers for the transfer of light. For example, optical fibers can be optically connected to another optical device, such as a light-emitting diode (LED), laser diode, or opto-electronic device for light transfer. As another example, optical fibers can be optically connected to other optical fibers through mated fiber optic connectors. In any of these cases, it may be important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

Flat end-faced multi-fiber ferrules may be provided to more easily facilitate multiple optical fiber connections between the fiber optic connector supporting the ferrule and other fiber optic connectors or other optical devices. In this regard, it may be important that fiber optic connectors be designed to allow the end faces of the optical fibers disposed in the ferrule to be placed into contact or closely spaced with an optical device or other optical fiber for light transfer. In conventional multi-fiber, fiber optic connectors, the excess fiber is removed by laser cleaving and the remaining protruding fiber precision polished to form a highly planar fiber array. When these connectors are mated, the end faces touch providing for low loss. This high precision polishing is costly and difficult.

Gradient index (GRIN) lenses offer an alternative to high precision polishing. GRIN lenses focus light through a precisely controlled radial variation of the lens material's index of refraction from the optical axis to the edge of the lens. The internal structure of this index gradient can dramatically reduce the need for high precision polishing and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can be planar to slightly inset with respect to the end face of the ferrule. The flat surface of the GRIN lens allows for easy cleaning of end faces of the GRIN lens. It may be important that the GRIN lens assembly be designed with internal holders that place and secure the GRIN lenses in alignment with the desired angular accuracy to avoid or reduce coupling loss.

Embodiments disclosed herein include GRIN lens assemblies employing lens alignment channels having a keyhole shape in optical connectors. Non-limiting examples of such optical connectors include plugs and receptacles. Fabrication of true holes within a ferrule to maintain GRIN lenses may introduce angular errors into the ferrule that may affect optical coupling between mated optical connectors. Fabrication of grooves within a ferrule to maintain GRIN lenses may provide for increased angular control of the location of the GRIN lenses. Accordingly, in some embodiments, the GRIN lens assembly contains one or more lens alignment channels configured to secure the one or more GRIN lenses in the GRIN lens assembly, as well as to accurately align the end faces of the GRIN lenses. The lens alignment channels of the embodiments described herein have a keyhole shape having a narrow portion that extends from a surface of a lens holder body. A wide portion that maintains a GRIN lens transitions from the narrow portion. Such a keyhole configuration may allow the lens holder body of the GRIN lens assembly to be fabricated using low cost molding process with the increased angular control provided by grooves, while also providing for precisely located holes for the GRIN lenses without require additional covers or other components to maintain the GRIN lenses within the GRIN lens assembly. For example, the keyhole lens alignment channels may be fabricated by a use of wire cut primary mold structure. GRIN lenses may be inserted from the mating face, and maintained by an interference fit, in some embodiments.

The GRIN lens assemblies disclosed herein can be provided as part of an optical fiber ferrule and/or a fiber optic component or connector for making optical connections. A fiber optic connector containing the GRIN lens assemblies disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer.

In this regard, in one embodiment, a GRIN lens assembly includes a lens holder body having a mating face, a surface extending from the mating face, and a lens alignment channel. The lens alignment channel is defined by a narrow portion extending from the surface to a first depth and at least partially along a length of the surface, and a wide portion extending from the narrow portion to a second depth. A lens opening defined by at least the wide portion of the lens alignment channel at the mating face is disposed in the mating face. The wide portion of the lens alignment channel is configured to support a GRIN lens disposed in the lens alignment channel such that an end portion of the GRIN lens is disposed at the lens opening.

In another embodiment, a fiber optic connector includes a connector housing and a lens holder body disposed within the connector housing. The lens holder body includes a mating face, a surface extending from the mating face, and a lens alignment channel. The lens alignment channel is defined by a narrow portion extending from the surface to a first depth and at least partially along a length of the surface, and a wide portion extending from the narrow portion to a second depth. A lens opening is disposed in the mating face that is defined by at least the wide portion of the lens alignment channel at the mating face. A GRIN lens is disposed in the wide portion of the lens alignment channel such that an end portion of the GRIN lens is disposed at the lens opening.

In yet another embodiment, a fiber optic cable assembly includes a connector housing and a lens holder body disposed within the connector housing. The lens holder body includes a mating face, a rear face, a surface extending from the mating face, and a lens alignment channel defined by a narrow portion extending from the surface to a first depth, and a wide portion extending from the narrow portion to a second depth between the mating face and the rear face. A lens opening defined by at least the wide portion of the lens alignment channel is disposed in the mating face. A fiber opening defined by at least the wide portion of the lens alignment channel is disposed in the rear face. The fiber optic cable assembly further includes a GRIN lens disposed in the wide portion of the lens alignment channel such that an end portion of the GRIN lens is disposed at the lens opening, and an optical fiber disposed in the wide portion of the lens alignment channel through the fiber opening at the rear face.

In yet another embodiment, a fiber optic connector includes a lens holder body, a GRIN lens, and a cover. The lens holder body includes a mating face, a surface extending from the mating face, a lens alignment channel defined by a narrow portion extending from the surface to a first depth and at least partially along a length of the surface, and a wide portion extending from the narrow portion to a second depth. A lens opening defined by at least the wide portion of the lens alignment channel at the mating face is disposed in the mating face. The GRIN lens is disposed in the wide portion of the lens alignment channel such that an end portion of the GRIN lens is disposed in the lens opening. The cover is disposed on the mating face of the lens holder body, and includes a cover opening configured to expose the end portion of the GRIN lens.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 3A and 3B are perspective views of an exemplary GRIN lens assembly and an exemplary GRIN lens assembly of a receptacle in an unmated arrangement;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient index (GRIN) lens assemblies, fiber optic connectors, and fiber optic cable assemblies employing lens alignment channels having a keyhole shape for maintaining and aligning GRIN lenses. Non-limiting examples of fiber optic connectors include plugs and receptacles. In some embodiments, one or more lens alignment channels include a narrow portion that extends from a surface of a lens holder body and transitions into a wide portion configured to receive a GRIN lens. The wide portion defines an opening in a mating face of the lens holder body into which the GRIN lens may be inserted such that an end face of the GRIN lens is exposed at the mating face. As described in more detail below, the keyhole-shaped lens alignment channels may be formed using inexpensive, precision groove-forming molding techniques to achieve holes with increased angular control into which the GRIN lenses may be inserted without the need for additional components to maintain the GRIN lenses within the lens holder body, such as cover components.

The GRIN lens assemblies disclosed herein can be provided as part of an optical fiber ferrule and/or a fiber optic component or connector for making optical connections. A fiber optic connector containing the GRIN lens assemblies disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer. As a non-limiting example, the GRIN lens assemblies disclosed herein can be provided as part of a plug or receptacle containing one or more optical fibers for establishing optical connections.

Figure 1A:
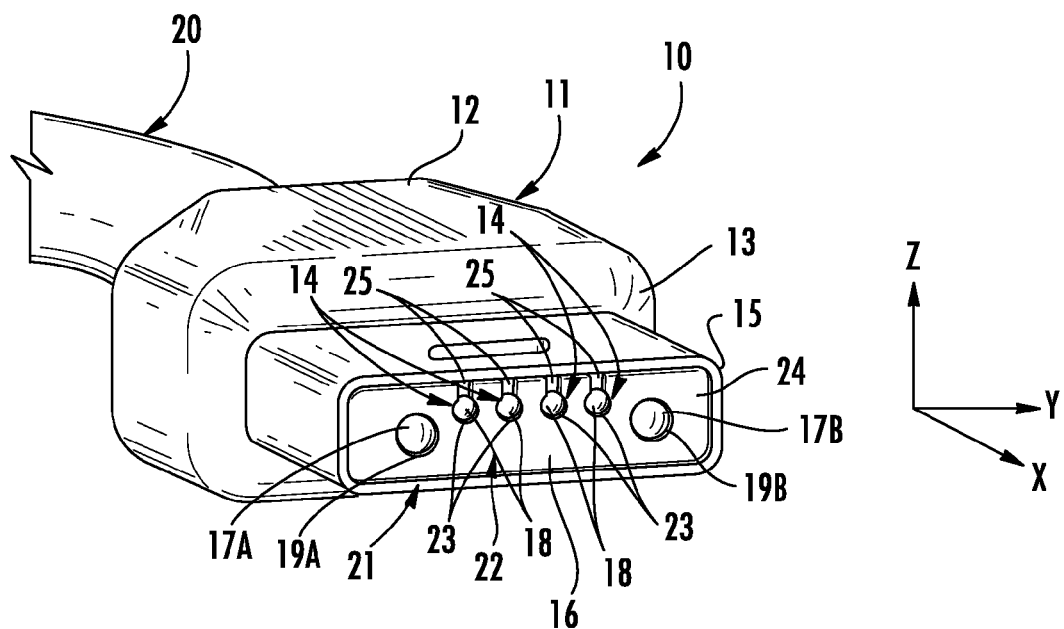
FIG. 1A is a perspective view of an exemplary fiber optic cable assembly employing a gradient-index (GRIN) lens assembly with lens alignment channels.

In this regard, FIG. 1A depicts an exemplary optical cable assembly 10 having fiber optic connector 11 configured as a plug. The fiber optic connector 11 generally comprises a connector body 12 having a connector housing 15 extending from a front surface 13 of the connector body. The fiber optic connector 11 further comprises optical fibers disposed in a cable 20 secured to the connector body 12. The connector housing 15 defines a plug portion that may be inserted into a corresponding receptacle.

The connector housing 15 also defines an optical connector opening 21 that exposes a GRIN lens assembly 22 that is maintained in an enclosure within the connector housing 15. The illustrated GRIN lens assembly 22 comprises a lens holder body 24 having a mating face 16 and a plurality of lens alignment channels 14 at the mating face and extending at least partially along a top surface of the lens holder body 24. The lens alignment channels 14 have a generally keyhole shape, with a narrow portion 25 extending from the top surface of the lens holder body 24. The narrow portion 25 of the lens alignment channels 14 transitions into a wide portion 23 that matches the shape of the GRIN lenses 18 that are disposed therein. In the illustrated embodiment, the wide portion 23 defines a circular opening through which the GRIN lenses 18 may be inserted. The end face of the GRIN lenses 18 may be planar with respect to the mating face 16, or slightly inset (e.g., within 0-50 μm). As described in more detail below, the lens alignment channels 14 may extend at least a portion over the top surface of the lens holder body 24.

In some embodiments, the GRIN lenses 18 are disposed in the wide portion 23 of the lens alignment channel 14 by an interference fit. The GRIN lenses 18 may also be secured to the lens holder body 24 by the application of an index-matching adhesive (e.g., epoxy or other) into the narrow portion 25 of the lens alignment channels. The individual optical fibers within the cable 20 are also disposed within the wide portion 23 of the lens alignment channels 14 and optically coupled to the GRIN lenses 18.

The lens holder body 124 of the illustrated embodiment further comprises a first bore 19A and a second bore 19B. The optical connector 11 further comprises a first pin 17A and a second pin 17B that extend longitudinally within the connector housing 15 along the x-axis, or optical axis, of the optical connector 11. The GRIN lens assembly 22 is located within the defined by the connector housing 15 such that the first pin 17A is disposed in the first bore 19A, and the second pin 17B is disposed within the second bore 19B. The GRIN lens assembly 22 is operable to translate within the connector housing 15 on the first and second pins 17A, 17B to retract within the connector housing 15 when the optical connector 11 is mated to a corresponding optical connector, such as a receptacle. The exemplary optical connector may further comprise a first bias member and a second bias member (not visible in the figures) that are disposed about the first and second pins 17A, 17B, respectively, within the connector body enclosure to bias the GRIN lens assembly 22 toward the optical connector opening 21. The first and second bias members may be configured as compression springs. It should be understood that, in other embodiments, the GRIN lens assembly 22 may not be configured to translate within the connector housing 15.

The lens holder body 24 may be fabricated of a moldable material, such as a metallic material, a thermoplastic material, and the like. Use of the keyhole-shaped lens alignment channels 14 enable the use of a primary mold structure that yields an emulated hole (defined by the wide portion 23) with the accuracy of molded groove. In some embodiments, the primary mold structure may be a wire cut mold, for example, by electron discharge machining ("EDM"). The shape of the lens alignment channels 14 allow for the GRIN lens 18 to be front-inserted at the mating face 16 and maintained by an interference fit, as opposed to a traditional groove-based alignment feature that requires adhesive and a separate lens cover to enclose the GRIN lens.

In some embodiments, the optical connector 11 may further include two or more electrical contacts (not shown) for providing electrical power and/or data over the optical cable assembly 10.

Figure 1B:
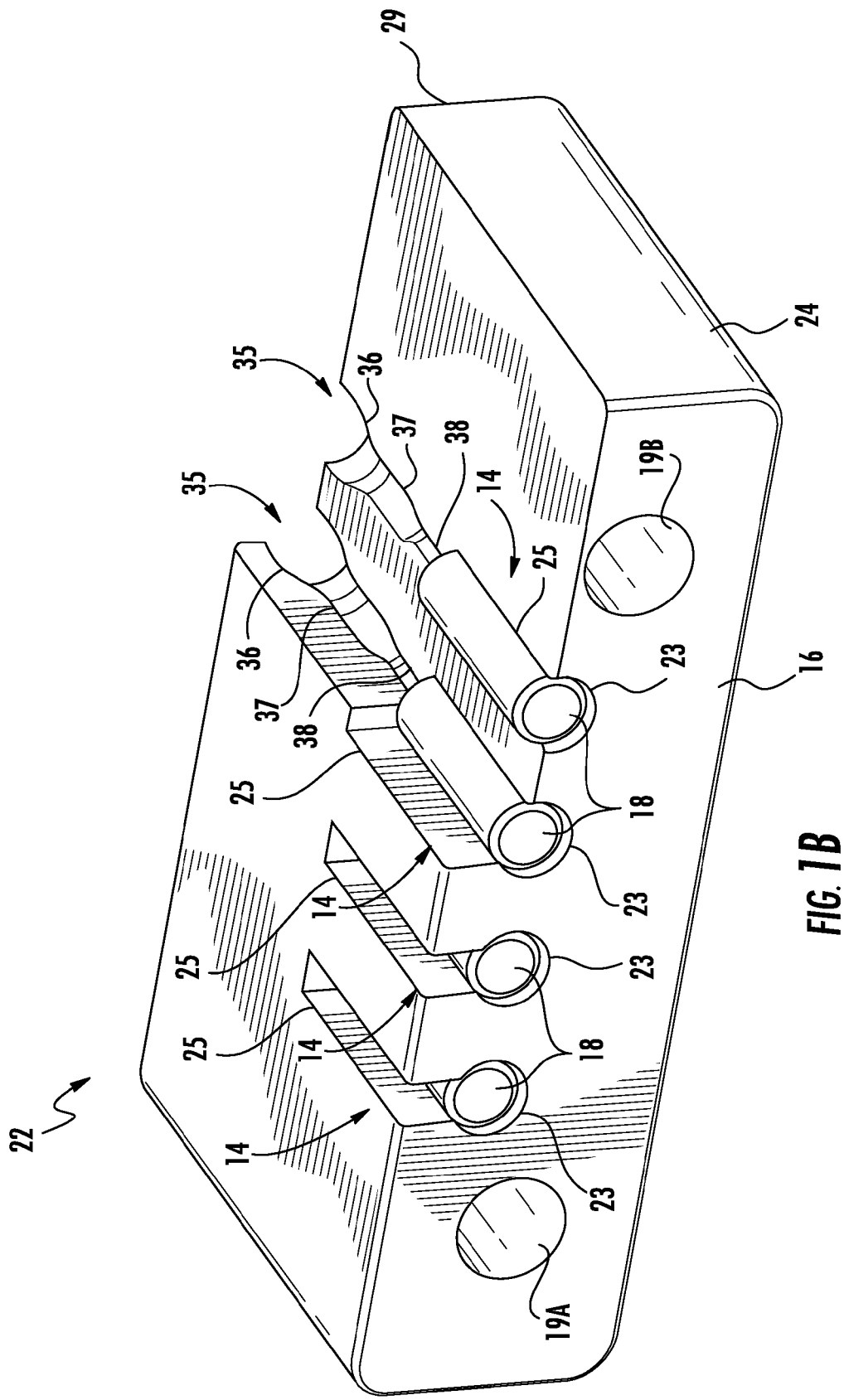
FIG. 1B is a perspective, cut away view of an exemplary GRIN lens assembly having keyhole-shaped grooves.

FIG. 1B depicts an exemplary GRIN lens assembly 22 according to the embodiment depicted in FIG. 1A. Each lens alignment channel 14 of the illustrated embodiment includes a narrow portion 25 and a wide portion 23. The narrow portion 25 extends from the top surface 28 (or bottom surface) to a first depth $d_1$. The dimension of the first depth $d_1$ may depend on the desired location of the GRIN lenses 18 within the mating face 116 of the lens holder body 24. For example, a deeper first depth $d_1$ than that shown in FIG. 1B would be needed to position the GRIN lenses 18 at the center of the mating face 16. The narrow portion 25 is configured as rectangular; however, other shapes may be utilized. For example, the walls of the narrow portion 25 may be inwardly angled.

The narrow portion 25 of each lens alignment channel 14 transitions to a wide portion 23 that is configured to receive a GRIN lens 18. The wide portion 23 extends from the narrow portion 25 to a second depth $d_2$ with respect to the top surface 28. In the illustrated embodiment, the wide portion 23 is shaped to form a circular lens opening 21 at the mating face. The circular lens opening 21 is almost a complete circle. The diameter of the wide portion 23 and resulting lens opening 21 may be such that the inserted GRIN lenses are retained within the lens holder body 24 by an interference fit. It should be understood that embodiments are not limited to a circular wide portion and lens opening, and that other shapes may be utilized.

The plurality of lens alignment channels 14 may extend across a portion of the length of the lens holder body 24, as depicted in FIG. 1B. In other embodiments, the lens alignment channels may extend across the entire length of the lens holder body. A plurality of fiber through holes 35 extend from a rear face 29 and into the lens holder body 24. The cut away portion of the lens holder body 24 depicted in FIG. 1B illustrates two internal exemplary fiber through holes 35. The fiber through holes 35 define fiber openings 26 in the rear face 29 of the lens holder body 24 into which optical fibers may be inserted. The exemplary fiber through holes 35 have three sections: a wide section 36 at the fiber opening 26, a tapered section 37 transitioning from the wide section 36, and a narrow section 38 transitioning from the tapered section 37. The wide section 36 may have a diameter configured to receive an unstripped portion of an optical fiber, wherein outer layers, such as cladding and other coating layers, are present. The tapered section 37 provides for a reduced diameter of the optical fiber wherein one or more fiber layers are removed. The narrow section 38 has a diameter configured to receive a glass fiber core fiber of the optical fiber for coupling to the GRIN lens 18. The narrow section 38 is coupled to the wide portion 23 of the lens alignment channel 14 so that the plurality of optical fibers present within the fiber through holes 35 may be optically coupled to the plurality of GRIN lenses 18 disposed in the plurality of lens alignment channels 14. In other embodiments, the fiber through holes 35 may have more or fewer sections, depending on the particular application.

Figure 2A:
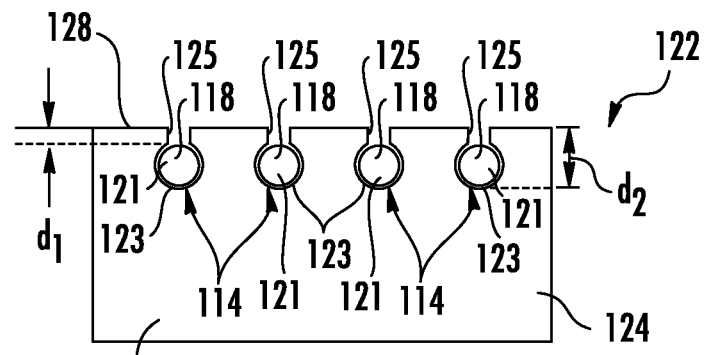
FIG. 2A is a front view of a mating face of an exemplary GRIN lens assembly with lens alignment channels.
Figure 2B:
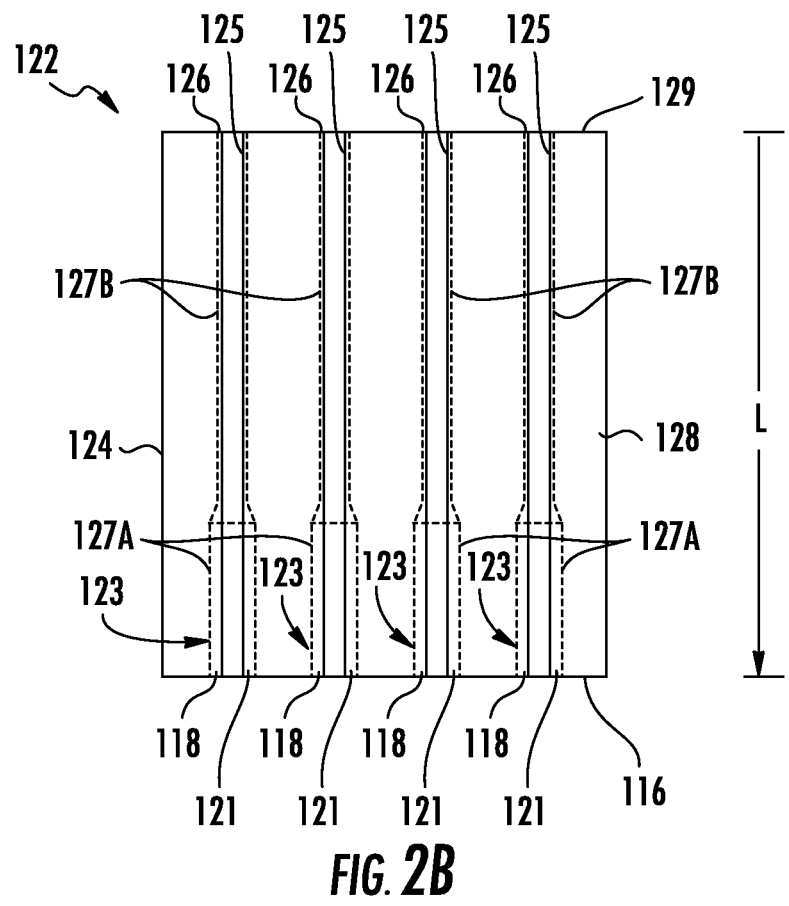
FIG. 2B is a top view of the exemplary GRIN lens assembly depicted in FIG. 2A.
Figure 2C:
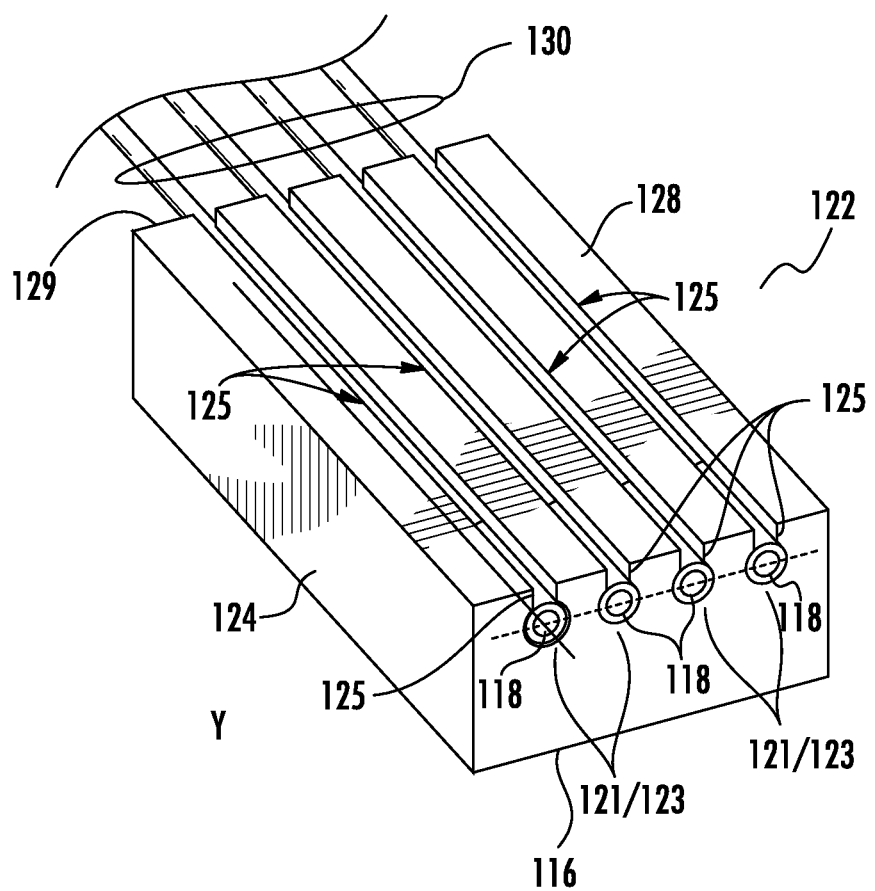
FIG. 2C is a top perspective view of the exemplary GRIN lens assembly depicted in FIG. 2A.

Referring now to FIGS. 2A-2C, an exemplary GRIN lens assembly 122 is schematically depicted. The GRIN lens assembly 122 may be incorporated into any optical connector package. The GRIN lens assembly 122 includes a lens holder body 124 having a mating face 116, a rear face 129, and a surface extending between mating face 116 and the rear face 129 (i.e., a top surface 128). The lens holder body 124 includes a plurality of lens alignment channels 114 that extend from the top surface 128 into a bulk of the lens holder body 124. In the illustrated embodiment, the plurality of lens alignment channels 114 fully traverses the top surface 128 from the mating face 116 to the rear face 129. In other embodiments, the plurality of lens alignment channels 114 may only traverse a portion of the surface of the lens holder body 124 (see FIGS. 1B, 3A and 3B).

Referring specifically to FIG. 2A, each lens alignment channel 114 of the illustrated embodiment includes a narrow portion 125 and a wide portion 123. The narrow portion 125 extends from the top surface 128 (or bottom surface) to a first depth $d_1$. The dimension of the first depth $d_1$ may depend on the desired location of the GRIN lenses 118 within the mating face 116 of the lens holder body 124. For example, a deeper first depth $d_1$ than that shown in FIG. 2A would be needed to position the GRIN lenses 118 at the center of the mating face 116. The narrow portion 125 is configured as rectangular; however, other shapes may be utilized. For example, the walls of the narrow portion 125 may be inwardly angled.

The narrow portion 125 of each lens alignment channel 114 transitions to a wide portion 123 that is configured to receive a GRIN lens 118. The wide portion 123 extends from the narrow portion 125 to a second depth $d_2$ with respect to the top surface 128. In the illustrated embodiment, the wide portion 123 is shaped to form a circular lens opening 121 at the mating face. The circular lens opening 121 is almost a complete circle. The diameter of the wide portion 123 and resulting lens opening 121 may be such that the inserted GRIN lenses are retained within the lens holder body 124 by an interference fit. It should be understood that embodiments are not limited to a circular wide portion and lens opening, and that other shapes may be utilized.

Referring now to FIGS. 2B and 2C, the plurality of lens alignment channels 114 may extend across an entire length L of the lens holder body 124, unlike the embodiment depicted in FIG. 1B. The wide portion 123 may also form a fiber opening 126 at the rear face 129 of the lens holder body 124 through which a plurality of optical fibers 130 may be inserted for optical coupling with the plurality of GRIN lenses 118. In some embodiments, the diameter or width of the wide portion 123 is constant throughout the length L of the lens holder body 124. In other embodiments, the wide portion 123 may comprise two or more segments having different diameters or widths. In the illustrated embodiment, each wide portion 123 comprises a first segment 127A and a second segment 127B, wherein the width of the first segment 127A is greater than the second segment 127B. The width (or diameter) of the first segment 127A is such that a GRIN lens 118 may be disposed therein. The width (or diameter) of the second segment 127B is such that an optical fiber 130 may be disposed therein. As shown best in the top view provided by FIG. 2B, the width of the first segment 127A may taper into the width of the second segment 127B. Alternatively, the first segment 127A may discretely transition into the second segment 127B.

Figure 3C:
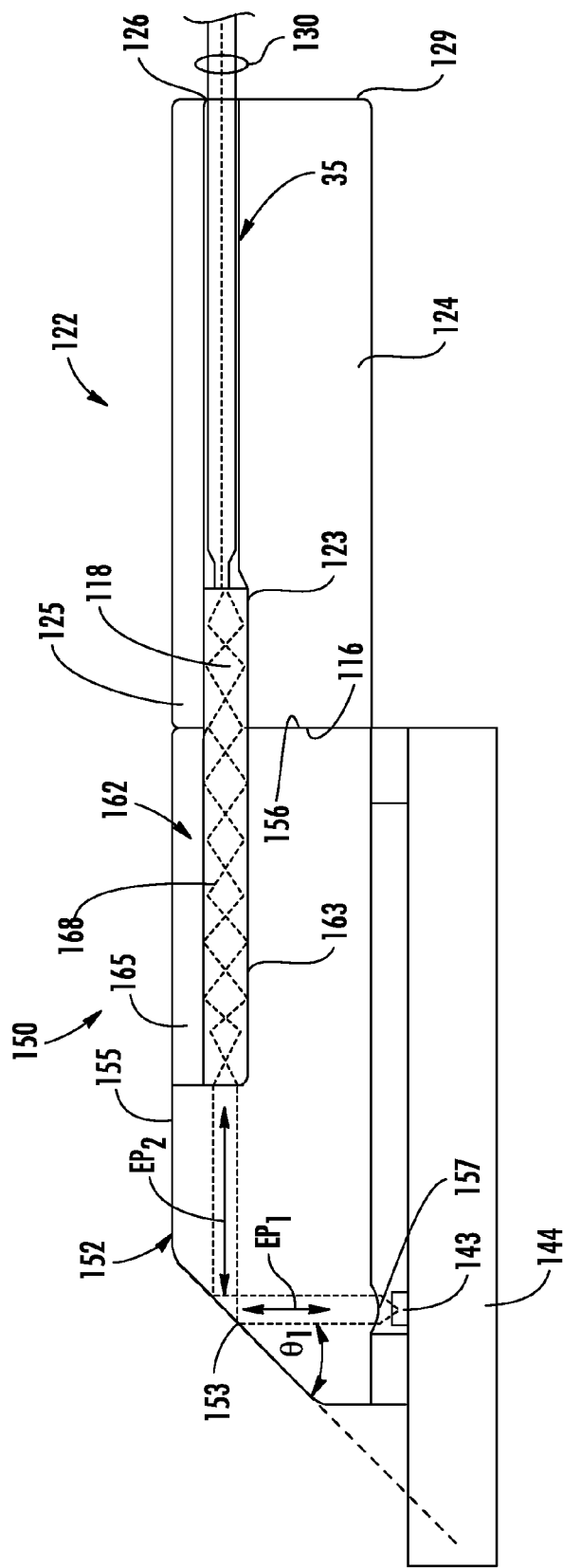
FIG. 3C is a side view of the exemplary GRIN lens assemblies depicted in FIGS. 3A and 3B in a mated arrangement.

FIGS. 3A and 3B are left and right perspective views, respectively, of an exemplary GRIN lens assembly 122 of an optical connector (not shown) that can be mated with an exemplary GRIN lens assembly 150 of a receptacle connector (not shown). FIG. 3C is a side view of the GRIN lens assemblies 122, 150 in FIG. 3A mated together. For example, the GRIN lens assembly 122 could be disposed in an optical connector configured as a plug and the GRIN lens assembly 150 could be disposed in a receptacle, such that when the plug and receptacle are mated, the GRIN lens assemblies 122, 150 are mated. Mating of the GRIN lens assemblies 122, 150 optically connects GRIN lenses 118 disposed in the GRIN lens assembly 122 of the plug with GRIN lenses 168 disposed in the GRIN lens assembly 150 of the receptacle. Unlike the embodiment depicted in FIGS. 2A-2C, the lens alignment channels 114 traverse only a portion of the lens holder body 124. The lens holder body 124 of FIGS. 3A and 3B may further include fiber through holes 35 as depicted in FIG. 1B.

The receptacle GRIN lens assembly 150 includes a lens holder body 152 having a plurality of GRIN lenses 168 disposed in a plurality of keyhole-shaped lens alignment channels 162. The lens holder body 152 has a mating face 156 that contacts the mating face 116 of the lens holder body 124 of the plug, as shown in FIG. 3C. As described above with respect to the GRIN lens assembly 122 of the plug, each lens alignment channel 162 comprises a narrow portion 165 and a wide portion 163. The lens alignment channels 162 of the illustrated embodiment extend from the mating face 156 across a portion of the top surface 155 of the lens holder body 152. Depending on the configuration of the receptacle and the lens holder body 152, the lens alignment channels 162 may extend across the full length of the top surface 155 in other embodiments. As described above, the GRIN lenses 168 may be disposed on the wide portion 163 of the lens alignment channels 162 and maintained therein by an interference fit. The GRIN lenses 168 may also be secured in the lens alignment channels 162 by an appropriate index-matching adhesive, if desired.

As illustrated in FIGS. 3A-3C, the mating face 116 of the lens holder body 124 of the plug is configured to abut with the mating face 156 of the lens holder body 152 of the receptacle to optically connect their respective supported GRIN lenses 118, 168. The GRIN lenses 118, 168 should be properly aligned with their respective lens holder bodies 124, 152 and their respective mating faces 116, 156 to avoid or reduce coupling losses when the mating faces 116, 156 are abutted to each other to optically connect their respective supported GRIN lenses 118, 168.

As shown in FIG. 3C, a total internal reflection ("TIR") surface 153 is provided in the lens holder body 152 of the receptacle to reflect light to and from the GRIN lenses 168 disposed therein. For example, the TIR surface 153 may be disposed at angle $\Theta_1$ relative to the emission path $EP_1$, which is forty-five (45) degrees in the non-limiting example of the lens holder body 152. Light can be received through lenses 157 from a transmitting/receiving optical device 143 disposed on a substrate shown as a printed circuit board 140 (PCB) and be emitted in emission path $EP_1$. The lens holder body 152 and the printed circuit board 140 define a recess 154 in which one or more transmitting/receiving optical devices 143 are disposed. This light is reflected off the TIR surface 153 into emission path $EP_2$ to the GRIN lenses 168. Similarly, light received from the GRIN lenses 168 in emission path $EP_2$ is reflected off the TIR surface 153 into emission path $EP_1$ and transmitted to the lenses 157, which can be received by a transmitting/receiving optical device 143.

Figure 4:
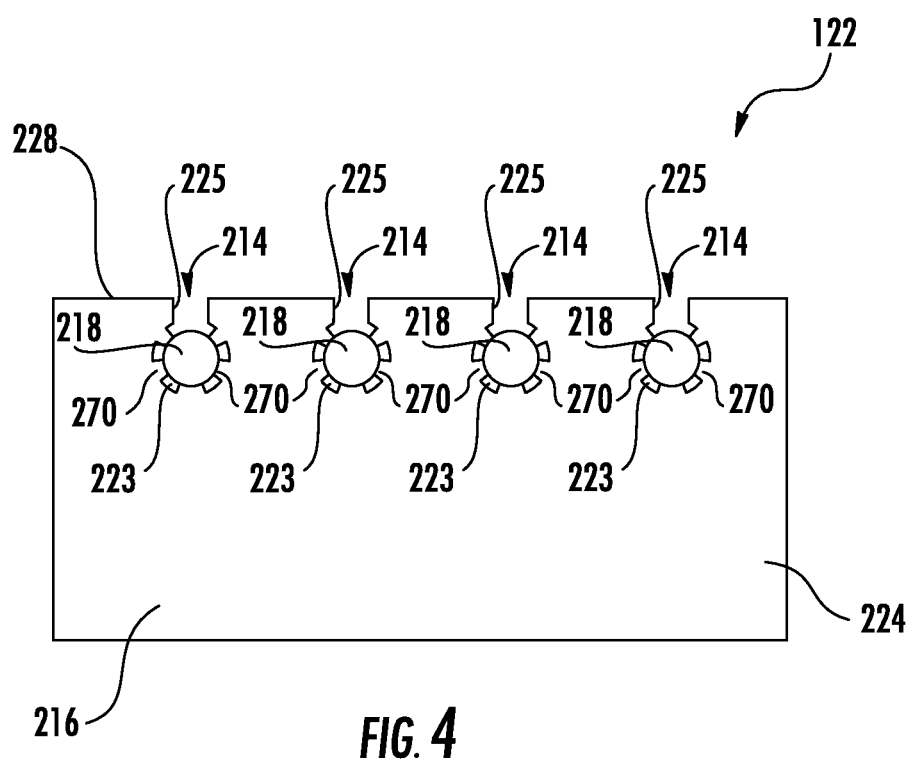
FIG. 4 is a front view of a mating face of an exemplary GRIN lens assembly with lens alignment channels having circumferential raised portions.

Referring now to FIG. 4, a mating face 216 of an alternative GRIN lens assembly 222 according to another embodiment is depicted. Similar to the embodiment depicted in FIG. 2A, the GRIN lens assembly 222 comprises a lens holder body 224 and a plurality of GRIN lenses 118 disposed in a plurality of lens alignment channels 214 that define a plurality of lens openings 221. The plurality of lens alignment channels 214 comprise a narrow portion 225 that extend from a top surface 228 of the lens holder body 224 and transition into a wide portion 223. Unlike the embodiment depicted in FIG. 2A, the wide portion 223 of the lens alignment channels 214 comprise circumferential raised portions 270, the surface of which are configured to contact the surface of the GRIN lens 218 to provide a limited interference fit. Any number of circumferential raised portions 270 may be included.

Figure 5A:
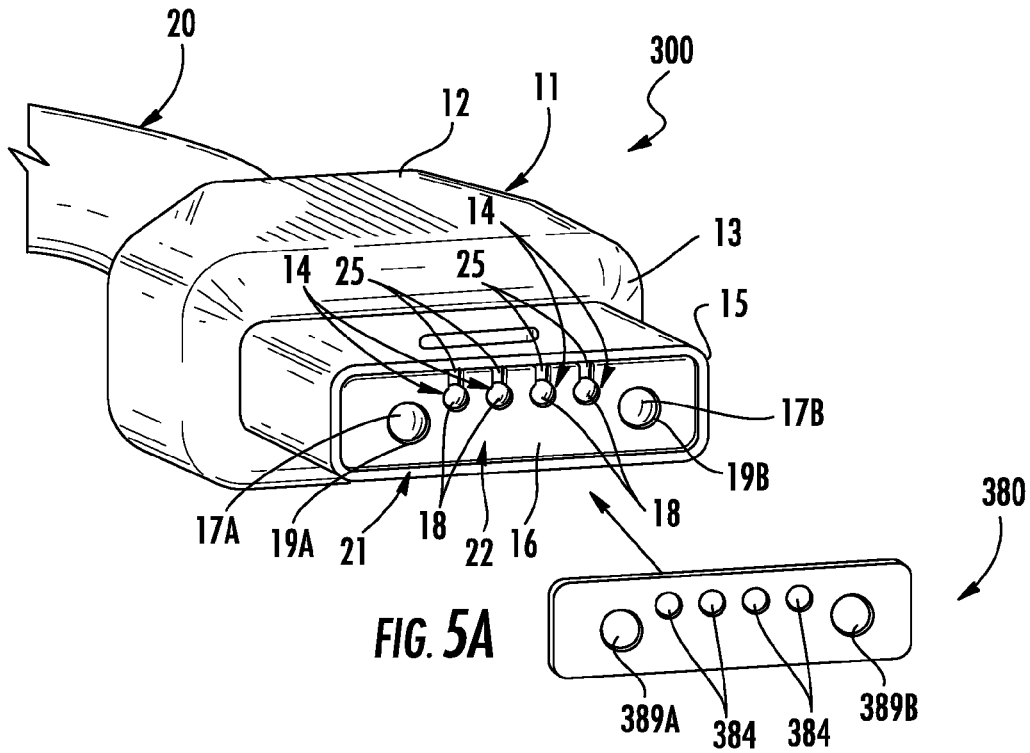
FIG. 5A is a perspective view of the exemplary fiber optic cable assembly depicted in FIG. 1A with a cover for the mating face of the GRIN lens assembly removed.
Figure 5B:
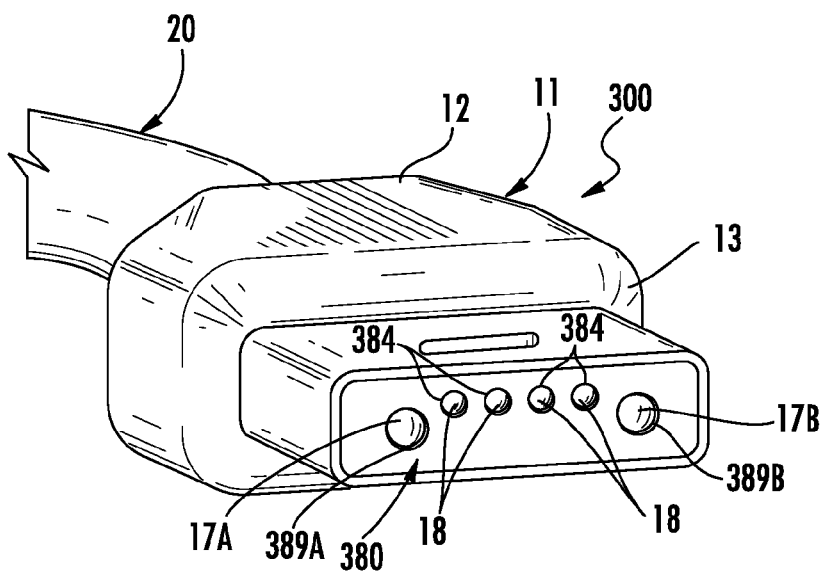
FIG. 5B is a perspective view of the exemplary fiber optic cable assembly depicted in FIG. 1A with the cover depicted in FIG. 5A coupled to the mating face of the GRIN lens assembly.

FIGS. 5A and 5B depict an optical cable assembly 300 configured as depicted in FIG. 1A, except with the addition of a cover 380 that is coupled to the mating face 16 of the GRIN lens assembly 22. FIG. 5A shows the cover 380 removed from the mating face 16, while FIG. 5B shows the cover 380 coupled to the mating face 16. The cover 380 may be included as a component in the fiber optic connector 11 to prevent debris from building up around the end faces of the GRIN lenses 18, particularly in the open space above the GRIN lenses 18 defined by the narrow portion 25 of the lens alignment channels 14.

The cover 380 includes a cover opening 384 for each GRIN lens 18 of the GRIN lens assembly 22 such that optical signals may pass to and from the end face of each GRIN lens 18. In embodiments that utilize a translating GRIN lens assembly 22, such as the embodiment depicted in FIGS. 5A and 5B, the cover 380 also includes first and second pin openings 389A, 389B. The first and second pins 17A, 17B may pass through the first and second pin openings 389A, 389B as the GRIN lens assembly 22 translates within the connector housing 15.

In some embodiments, the end faces of the GRIN lenses 18 are inset from the cover 380. As an example and not a limitation, the end faces of the GRIN lenses 18 may be offset from the cover 380 by about 25 nm to about 50 nm. In other embodiments, the end faces of the GRIN lenses 18 are substantially planar with respect to an outer surface of the cover 380.

The covers described herein may be fabricated from any sufficiently rigid material. In some embodiments, the cover 380 (as well as the other covers described herein) is made of a metallic material. As an example and not a limitation, in some embodiments the cover is made of stainless steel. The cover 380 may also be fabricated by a variety of processes, including, but not limited to, laser cutting processes and stamping processes. The thickness of the cover 380 is not limited. As a non-limiting example, the thickness of the cover may be about 100 μm to about 300 μm in some embodiments.

Figure 6A:
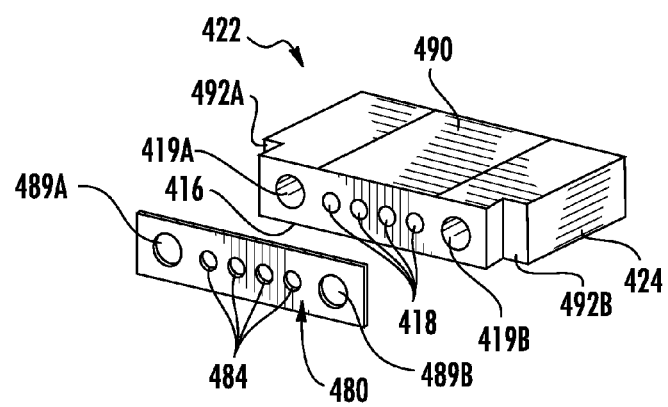
FIG. 6A is a perspective view of an exemplary GRIN lens assembly and a cover with the cover removed from the mating face.
Figure 6B:
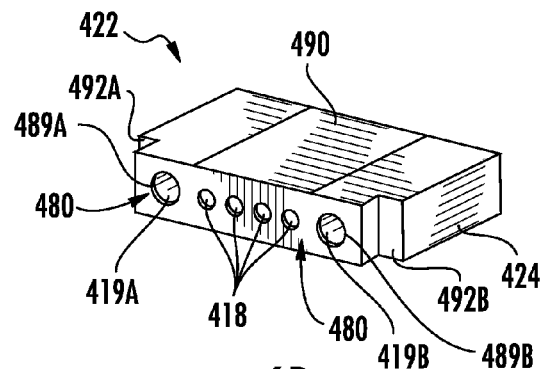
FIG. 6B is a perspective view of the exemplary GRIN lens assembly depicted in FIG. 6A with the cover depicted in FIG. 6A coupled to the mating face of the GRIN lens assembly.

The cover may be utilized to cover the mating face of GRIN lens assemblies, ferrules, and other optical coupling components that do not have the keyhole-shaped lens alignment channels as described above. FIGS. 6A and 6B depict a GRIN lens assembly 422 comprising a plurality of GRIN lenses 418 that are disposed in lens alignment grooves of a lens holder body 424 and covered by a top cover 490. The GRIN lenses 418 and top cover 490 may be secured to the lens holder body 424 by an index-matching adhesive.

The illustrated GRIN lens assembly 422 further includes first and second bores 419A, 419B through which first and second alignment pins may be disposed, as described above. The mating face 416 of the illustrated GRIN lens assembly 422 protrudes from a remaining portion of the lens holder body 424 and forms first and second notches 492A, 492B. A cover 480 is coupled to the mating face 416 to prevent debris buildup, particularly along the seam between the top cover 490 and the GRIN lenses and the lens holder body 424. The cover 480 includes first and second pin openings 489A, 489B positioned over the first and second bores 419A, 419B, respectively, and cover openings 484 positioned over the end faces of the GRIN lenses 418.

Embodiments of the covers described herein may be coupled to the mating face of the GRIN lens assembly or other optical coupling component by a variety of techniques. In some embodiments, the cover is bonded to the mating face by an adhesive. Mechanical engagement features may also be provided in the cover and the lens holder body (e.g., snap features). For example, the cover may include features that wrap around the mating face at the first and second notches 492A, 492B to couple the cover 480 to the lens holder body 424. Features may also be provided in the cover to insert mold the cover onto the mating face.

Use of the cover may also enable in situ laser cleaving of the GRIN lenses. The GRIN lenses (or fibers) may be cut off the mating face of the lens holder. Any remaining damage to the mating face due to the cleaving may then be covered by the cover.

It should now be understood that embodiments described herein are directed to GRIN lens assemblies, fiber optic connectors, and fiber optic cable assemblies employing lens alignment channels having a keyhole shape for maintaining and aligning GRIN lenses. The keyhole-shaped lens alignment channels may be formed using inexpensive, precision groove-forming molding techniques while also achieving holes into which the GRIN lenses may be inserted without additional lens-securing structures, such as top covers. In some embodiments, a cover may be coupled to a mating face of the GRIN lens assembly to prevent debris and liquid buildup at the mating face.

As non-limiting examples, the GRIN lenses disclosed herein may comprise a generally cylindrical glass member having a radially varying index of refraction, the glass member having a length such that the lens has a pitch of less than about 0.23. As used herein, the pitch length of the lens, $L_o$, is $2\pi/A$; the fractional pitch, or, hereafter, pitch, is $L/L_o = LA/2\pi$, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm. In certain embodiments, lenses having a diameter less than about 1 mm are operative to produce a beam having a mode field diameter between about 350 μm and 450 μm when illuminated with a beam having a mode field diameter of about 10.4 μm.

Examples of optical devices that can interface with the GRIN lenses disclosed in the GRIN lens assemblies disclosed herein include, but are not limited to, fiber optic collimators, DWDMs, OADMs, isolators, circulators, hybrid optical devices, optical attenuators, MEMs devices, and optical switches.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber optic cable assembly comprising:
    a connector housing;
    a lens holder body disposed within the connector housing, the lens holder body comprising:
        a mating face;
        a rear face;
        a surface extending from the mating face;
        a lens alignment channel, wherein the lens alignment channel comprises a narrow portion extending from the surface to a first depth, and a wide portion extending from the narrow portion to a second depth between the mating face and the rear face;
        a lens opening disposed in the mating face, the lens opening defined by at least the wide portion of the lens alignment channel; and
        a fiber opening disposed in the rear face, the fiber opening defined by at least the wide portion of the lens alignment channel;
    a GRIN lens disposed in the wide portion of the lens alignment channel such that an end portion of the GRIN lens is disposed at the lens opening; and
    an optical fiber disposed in the wide portion of the lens alignment channel though the fiber opening at the rear face.

2. The fiber optic cable assembly of claim 1, wherein:
    the wide portion of the lens alignment channel comprises a first segment extending from the mating face along a first length of the lens holder body, and a second segment extending from the first segment to the rear face of the lens holder body; and
    a width of the first segment is such that the GRIN lens is disposed within the lens alignment channel by an interference fit, and a width of the second segment is configured to receive the optical fiber.

3. The fiber optic cable assembly of claim 1, wherein the wide portion comprises a plurality of circumferential raised portions configured to contact a surface of the GRIN lens.

4. The fiber optic cable assembly of claim 3, further comprising a first pin and a second pin, wherein:
    the lens holder body comprises a first bore and a second bore; and
    the first pin is disposed within the first bore and the second pin is disposed within the second bore.

5. The fiber optic cable assembly of claim 3, further comprising a cover disposed on the mating face of the lens holder body, the cover comprising a cover opening, wherein the end portion of the GRIN lens is exposed by the cover opening.

* * * * *